US008169483B1

(12) United States Patent
Backus et al.

(10) Patent No.: US 8,169,483 B1
(45) Date of Patent: May 1, 2012

(54) SYSTEM AND METHOD FOR SYNCHRONIZING WAVEFORM DATA WITH AN ASSOCIATED VIDEO

(75) Inventors: Elaine Backus, Clovis, CA (US); William H. Bennett, Otterville, MO (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 757 days.

(21) Appl. No.: 12/245,022

(22) Filed: Oct. 3, 2008

(51) Int. Cl.
*H04N 7/18* (2006.01)

(52) U.S. Cl. .......................... 348/161; 600/477; 386/239

(58) Field of Classification Search .................. 348/143, 348/208.4; 330/297; 342/22; 345/440; 702/188; 73/510; 709/227; 701/35; 386/241; 715/513, 715/719; 347/224; 725/32; 600/473
See application file for complete search history.

(56) References Cited

U.S. PATENT DOCUMENTS

| | | | | |
|---|---|---|---|---|
| 4,717,889 A | * | 1/1988 | Engelmann | 330/297 |
| 5,835,667 A | * | 11/1998 | Wactlar et al. | 386/241 |
| 6,970,183 B1 | * | 11/2005 | Monroe | 348/143 |
| 7,467,603 B2 | * | 12/2008 | Davies | 119/712 |
| 7,631,326 B2 | * | 12/2009 | Kaneko | 725/32 |
| 2003/0154009 A1 | * | 8/2003 | Basir et al. | 701/35 |
| 2004/0030994 A1 | * | 2/2004 | Hui et al. | 715/513 |
| 2005/0223799 A1 | * | 10/2005 | Murphy | 73/510 |
| 2006/0038818 A1 | * | 2/2006 | Steele | 345/440 |
| 2007/0075890 A1 | * | 4/2007 | Jackson | 342/22 |
| 2007/0088833 A1 | * | 4/2007 | Yang et al. | 709/227 |
| 2007/0106484 A1 | * | 5/2007 | Sweatman et al. | 702/188 |
| 2008/0141135 A1 | * | 6/2008 | Mason et al. | 715/719 |
| 2009/0079809 A1 | * | 3/2009 | Yoon et al. | 347/224 |
| 2010/0079605 A1 | * | 4/2010 | Wang et al. | 348/208.4 |
| 2011/0040191 A1 | * | 2/2011 | Kyle et al. | 600/473 |

OTHER PUBLICATIONS

Backus, Elaine A., "History, Development, and Applications of the AC Electronic Monitoring System for Insect Feeding," Thomas Say Publications: Electronic Feeding Monitors, pp. 1-51.
Walker, G. P. et al., "A Beginner's Guide to Electronic Monitoring of Homopteran Probing Behavior," Thomas Say Publication in Entomology: Proceedings, pp. 14-40.

* cited by examiner

*Primary Examiner* — Dustin Nguyen
(74) *Attorney, Agent, or Firm* — John D. Fado; Robert D. Jones

(57) ABSTRACT

A subject is connected to a monitoring system and videoed while being monitored. The monitoring system receives raw data from the subject and processes the raw data into waveform data, and transmits the waveform data to a marking device. The marking device simultaneously marks the waveform data with a waveform reference point and causes a light emitting diode to flash in the video, thereby creating a video reference point. A computer program locks the waveform reference point with the video reference point and thereby synchronizes the waveform data with the video.

34 Claims, 3 Drawing Sheets

SYSTEM AND METHOD FOR SYNCHRONIZING WAVEFORM DATA WITH AN ASSOCIATED VIDEO

FIELD OF THE INVENTION

The current invention relates to a system for synchronizing waveform data associated with a subject, and a video of the subject filmed while the waveform data is generated. Specifically, the invention relates to synchronizing an electrical penetration graph (EPG) of a feeding insect with a corresponding video recording of the insect taken during the EPG process.

BACKGROUND OF THE INVENTION

As generally indicated above, the current invention is addressed to a method and apparatus for synchronizing waveform data and an associated video. Although the method and apparatus are generally directed to the evaluation of insect behavior, the technology has multiple other applications associated with the evaluation of other processes and/or organisms, including human subjects. For example, the current invention could be used to synchronize a video of an individual taking a polygraph examination with the actual polygraph readout. The technology described in the current invention may also be used in conjunction with other biological/biomedical time-based evaluations such as electrocardiograms (EKGs) and other medical monitoring technologies.

The current invention was designed to monitor the feeding process of the glassy-winged sharpshooter (*Homalodisca vitripennis*). The insect spreads the bacterium associated with Pierce's disease (*Xylella fastidiosa*), which is responsible for millions of dollars in damage to California's grape vineyards as well as other commercial crops (on Sep. 26, 2008, photos of the glassy-winged sharpshooter were available at: http://danr.ucop.edu/news/MediaKit/photos/default.shtml).

Sharpshooters acquire the *Xylella fastidiosa* bacterium from infected plants and transmit it to healthy plants. After adult sharpshooters acquire the bacteria, it remains in the insect's mouthparts throughout the insect's life. Researchers (including the inventors) are attempting to combat Pierce's disease by better understanding how glassy-winged sharpshooters carry and spread the disease.

One means of studying the transmission of the disease is through an understanding of the way the insects feed. Electrical penetration graph (EPG) technology provides information regarding the way that the insect draws its fluid food from plants. The EPG process is initiated by attaching a gold wire to the body of a sharpshooter and placing the sharpshooter in a feeding position on the leaf of a host plant. A plant electrode is then placed in the soil adjacent to the plant or attached directly to a part of the plant. A lead wire from the plant electrode and the gold wire attached to the insect are then connected to a monitoring system.

When the stylets (the probing and penetrating mouth parts of the insect) connect with the host plant, an electrical circuit is completed. As the insect's stylets probe the host plant, the voltage in the circuit fluctuates. Researchers have been able to correlate the voltage fluctuations with certain feeding activities to better understand the biological mechanisms that facilitate the spread of the *Xylella fastidiosa* bacteria.

An analog-to-digital converter in the system controller converts the analog EPG voltage waveforms to a digital signal at a selectable sampling rate generally set at 100 samples per second. The digitized EPG voltage waveforms are displayed on a time-based chart that is similar in many ways to a human EKG chart. Concurrent with the EPG process, researchers also make a video recording of the insect as it feeds on the host plant. However, the prior art includes no means of precisely synchronizing the video recording of the insect with the concurrent EPG reading.

At least one researcher has attempted to synchronize the insect video with the EPG readout by creating a "master" video that includes both the EPG readout and the insect video within the same camera frame. Specifically, the researcher created a video that (within the same camera frame) included a video of the feeding insect concurrent with a computer monitor displaying the EPG readout that was generated as the insect was feeding.

However, this process was generally unsatisfactory because (among other things), the master video was essentially a video of a video and a computer monitor. Consequently the resolution of the master video was less than desired. For the information to be useful, an operator should be able to read the fine gradations on the EPG printout and the synchronization of the video and EPG data must be more precise than this method afforded. As indicated above, the EPG waveform signal is generally digitized at 100 samples per second, while standard video is displayed at 30 frames per second.

The need exists for a synchronizing system which provides a means of establishing a precisely synchronous playback of the video of the feeding insect with time-based waveform data produced by the EPG instrument. The current invention provides a reliable means of ensuring that the video and the waveform data can be accurately synchronized.

SUMMARY OF THE INVENTION

The current invention is directed to a system for synchronizing waveform data associated with a subject, and a video of the subject recorded while the waveform data is generated. The current invention includes a monitoring system that receives raw data from the subject, processes the raw data into waveform data, and transmits the waveform data. The current invention also includes a video camera and video recorder. The video camera videos the subject while the subject generates the waveform data. The video recorder records the video taken by the video camera. A marking device receives the waveform data from the monitoring system and creates a waveform reference point. Simultaneously, the marking device flashes a light emitting diode (LED) in the same camera frame with the subject, thereby creating a video reference point. The video and video reference point, along with the waveform data and the waveform reference point, are then directed to a controller. Installed on the controller is a computer program. The computer program includes a means to synchronize the waveform reference point with the video reference point.

In operation, an operator synchronizes the waveform data with the video by directing the computer program to synchronize the waveform reference point with the video reference point, thereby synchronizing the video with the waveform data.

The current invention is also directed to a waveform data and video marking device. The marking device is primarily comprised of an integrated circuit assembly, a marker switch assembly, and a waveform marker assembly. The integrated circuit assembly generates a pulse train and transmits the pulses through the marker switch assembly to the waveform marker assembly. Each of the pulses has a high portion and a low portion. An LED connected to the marker switch assembly flashes "on" when the marker switch assembly receives the high portion of a pulse. The LED is positioned in the same camera frame as the subject being videoed.

The waveform marker assembly is connected to the marker switch assembly. The waveform marker assembly transmits waveform output data associated with the subject being videoed. The waveform output data spikes downwardly when the waveform marker assembly senses a drop in voltage associated with the LED flash.

In operation, the marking device creates a video reference point when the LED flashes "on", and simultaneously creates a waveform reference point when the waveform output data spikes downwardly. The marking device of the current invention thereby enables an operator to synchronize the waveform data with the video by synchronizing the waveform reference point with the video reference point.

The current invention is further directed to a method for synchronizing waveform data associated with a subject, and a video of the subject recorded during the waveform data generation. In accordance with the method of the current invention, an operator first starts the video recording process and initiates the electronic monitoring process. The results of the monitoring process are expressed as waveform data and the waveform data is transmitted to a marking device. The operator initiates the synchronization process by depressing a start button on the marking device. Depressing the start button causes an LED to flash "on" in the video, and the waveform output data to spike downwardly. When the operator releases the start button, the LED is extinguished and the waveform data is returned to an unaffected state. The monitoring and videoing process then continues until the operator terminates the process.

At the end of the process, a waveform data file is created. The waveform data file contains a compilation of the waveform data generated by the monitoring process. A video recording is also created. The video recording contains the results of the video recording process. After the process is terminated, an operator scrolls through the waveform data file and identifies and marks the first downward spike in the waveform data. The first downward spike is designated the waveform reference point. The operator also scrolls through the video recording and finds the first flash of the LED. The first flash of the LED in the video is designated as the video reference point. The operator then loads the waveform reference point and the video reference point into a computer program and instructs the computer program to synchronize the waveform reference point with the video reference point so that the waveform file is locked with the video file, thereby completing the synchronization process.

DETAILED DESCRIPTION OF PREFERRED EMBODIMENTS

The present invention comprises a method and apparatus for synchronizing a video recording with waveform data. A block diagram of the invention is generally shown in FIG. 1.

As indicated supra, one means of combating the transmission of Pierce's disease is through an understanding of the way that glassy-winged sharpshooter insects feed. Electrical penetration graph (EPG) technology provides information regarding the way that the insects draw moisture and nutrients from plants.

Figure 1:
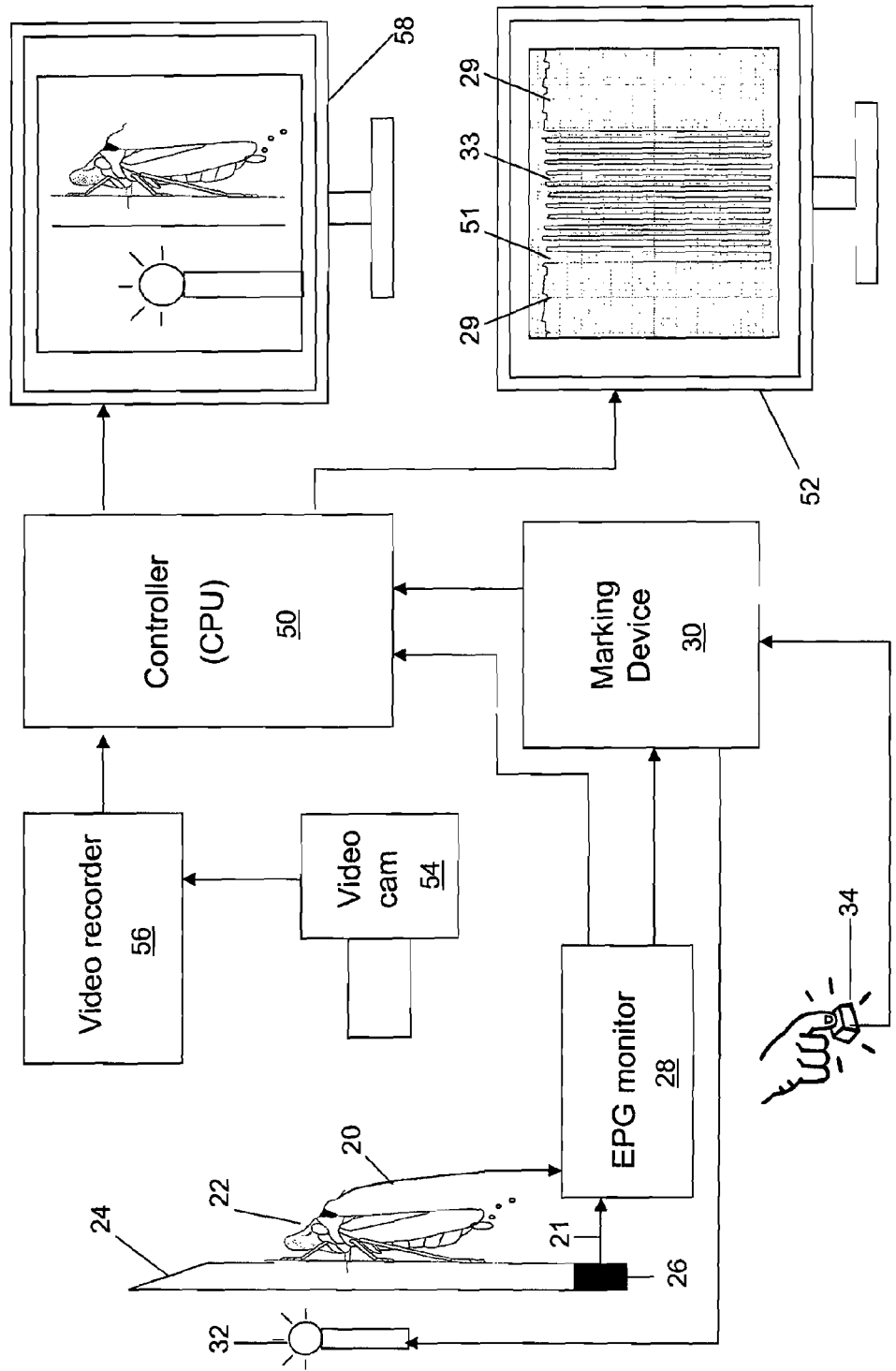
FIG. 1 is a block diagram of an exemplary embodiment of the current invention.

As shown in FIG. 1, the EPG process is initiated by attaching a gold wire 20 to the body of a sharpshooter 22 and placing the sharpshooter 22 in a feeding position on a host plant 24. A plant electrode 26 is then attached to the plant 24 or placed in the soil adjacent to the plant 24. A lead wire 21 from the plant electrode 26 and the gold wire 20 attached to the insect 22 are then connected to an EPG monitoring system 28.

When the stylets of the insect 22 make contact with the host plant 24, an electrical circuit is completed. As the insect's stylets probe the host plant 24, the voltage in the circuit fluctuates. The voltage fluctuations are processed into waveform data by the EPG monitor 28. A portion of the transmission from the EPG monitor 28 is routed through a marking device 30 to a central processing unit (CPU) which functions as a controller 50. A portion of the signal from the EPG monitor 28 is also routed directly to the controller 50. The controller 50 samples the analog voltage fluctuations at a selectable rate of 100 samples per second, thereby creating a digitized waveform file. As shown in FIG. 1, the digitized waveform 29 is displayed on a data monitor 52 in a time-based format or printed out as a time-based chart.

Concurrent with the EPG process, researchers also make a video recording of the insect's 22 feeding behavior. The video is taken by a video camera 54 and recorded by a video recorder 56. The video signal is sent to the controller 50 and displayed on a video monitor 58. For the sake of simplicity, a video monitor 58 and a data monitor 52 are depicted separately in FIG. 1. However, it should be understood that both the insect video and the digitized waveform can be displayed in a split screen format on a single monitor. Although the video and the waveform data can be displayed together, the prior art provides no means of precisely synchronizing the video with the waveform data. The current invention provides a method and apparatus for precisely synchronizing the video with the time-based waveform data.

As further shown in FIG. 1, the signal from the EPG monitor 28 is directed to the marking device 30. A light emitting diode (LED) 32 is also connected to the marking device 30. The LED 32 is positioned within the same camera frame as the insect 22 so that the video camera 54 image of the insect 22 includes the LED 32.

In operation, the synchronization process is initiated when an operator depresses a marking device start button 34 or other control mechanism on (or connected to) the marking device 30. When the start button 34 is depressed, the marking device 30 causes the LED 32 to flash rhythmically and simultaneously induces a pre-set spiking pattern 33 in the waveform data 29. An operator may depress the marking device start button 34 if the recording is started and stopped, or at any time during a data recording session.

At the conclusion of a data and video recording session, an operator scrolls back through the video to the first video frame that evidences a flash of the LED light 32. The operator then "marks" that frame as the video reference point. The operator also scrolls back through the waveform data 29 to the first marking device-induced downwardly spike 51 in the waveform data 29. The operator "marks" this point 51 in the waveform data 29 as the waveform reference point.

After the reference points have been marked, the operator loads the reference points into a commercially available software program called The Observer XT™ manufactured and sold by Noldus Information Technology (see http://www.noldus.com/site/doc200401012 for a description of The Observer XT™, as viewed Sep. 26, 2008). The Observer XT™ program also prompts the operator for the samples per second taken by the waveform data digitizer and the frames per second recorded by the digital video recorder. When the user instructs the program to synchronize the data, the software performs the function and the waveform data is precisely synchronized with the video.

Figure 2:
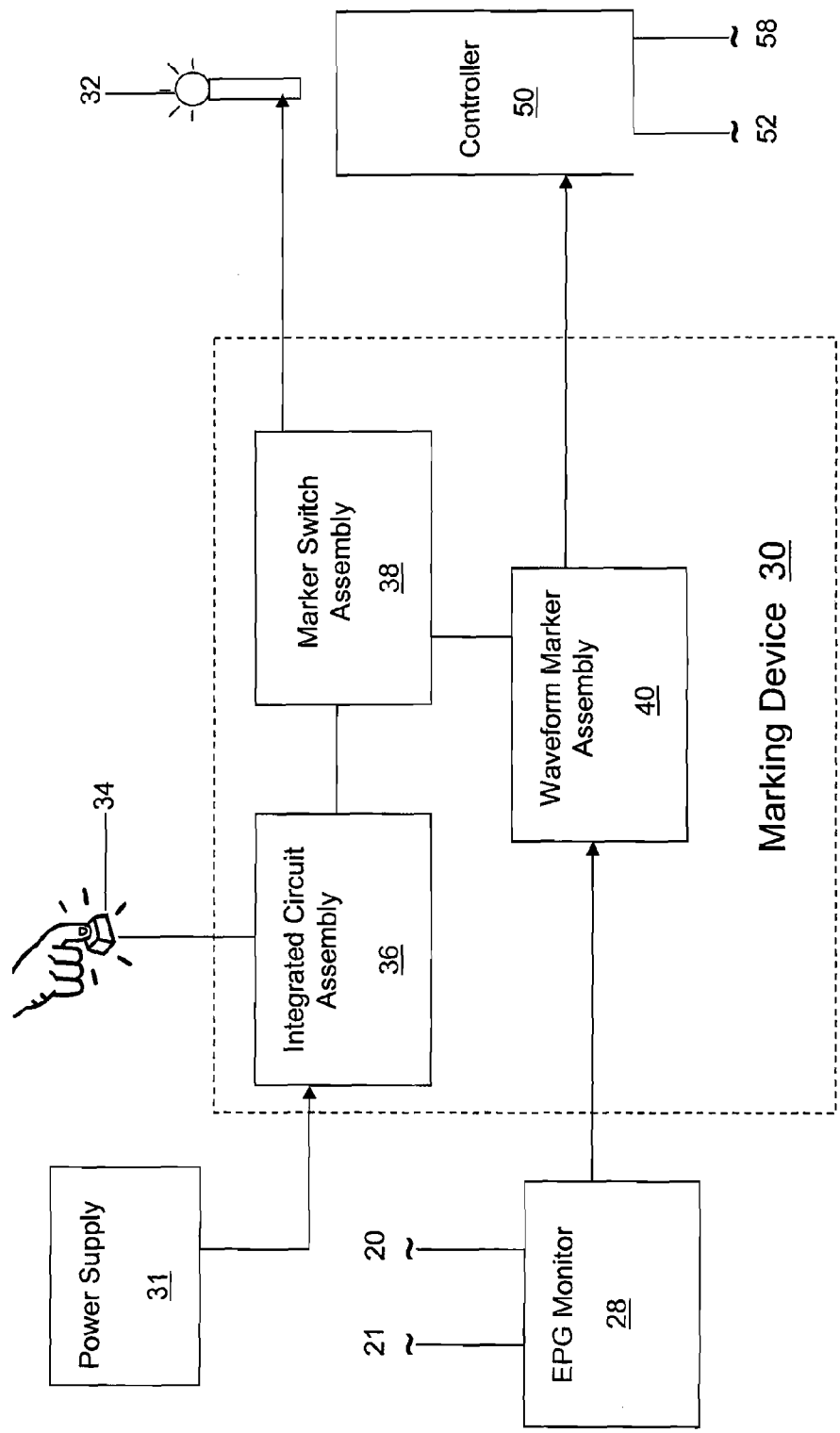
FIG. 2 is a block diagram of the marking device shown in FIG. 1.
Figure 3:
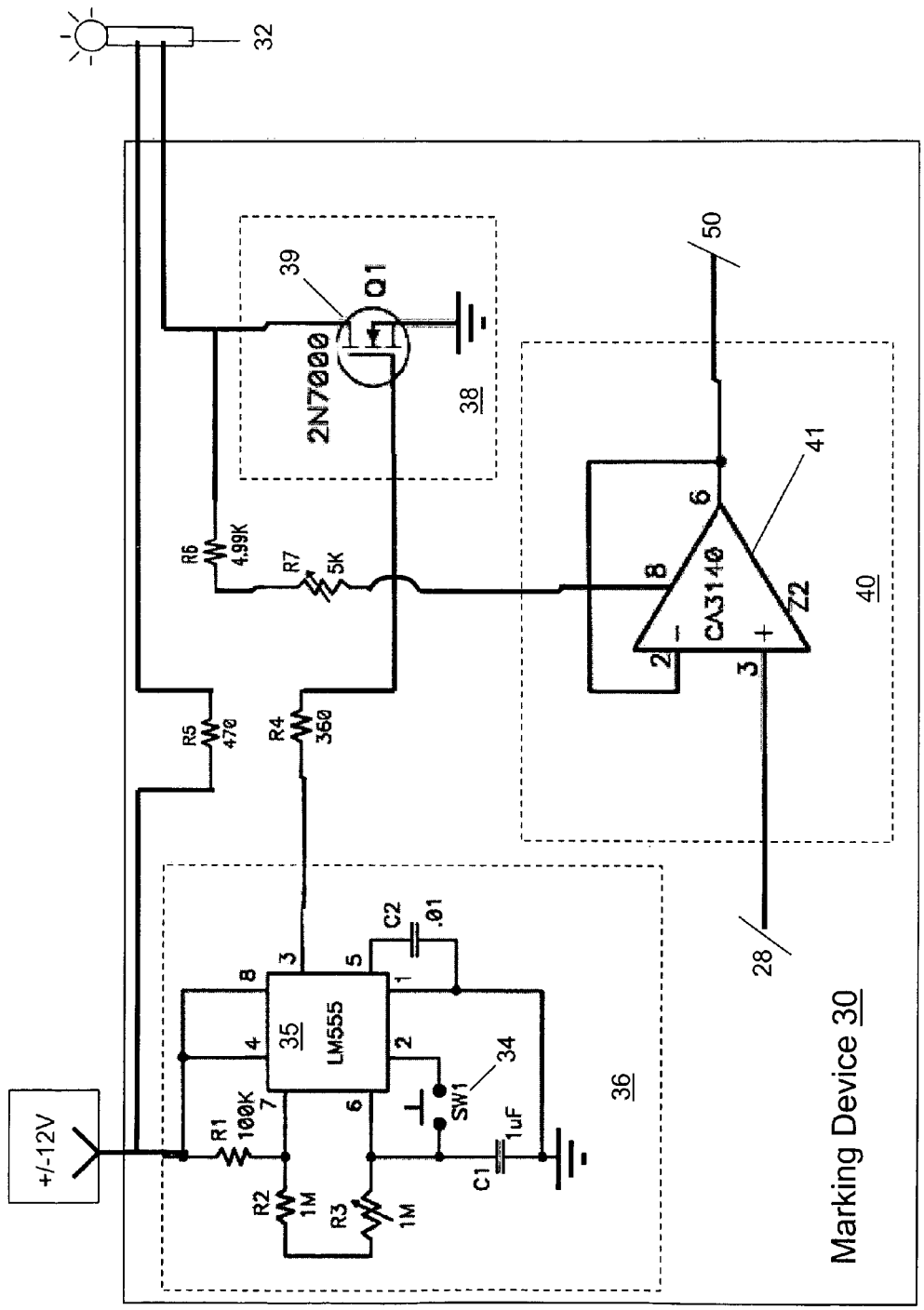
FIG. 3 is a circuit diagram of the marking device shown in FIGS. 1 and 2.

FIGS. 2 and 3 depict a block diagram and a circuit diagram (respectively) of the marking device 30 disclosed in FIG. 1. As shown in FIGS. 2 and 3, the marking device 30 is comprised primarily of an integrated circuit assembly 36, a marker switch assembly 38 and a waveform marker assembly 40, and powered by a conventional 12 volt power supply 31. Note that in FIG. 3, the single digit numbers associated with the integrated circuit assembly 36 and the waveform marker assembly 40 denotes the respective pins associated with the input/output of electrical current to/from devices in the respective assemblies 36, 40.

As shown in FIG. 3, in the preferred embodiment, the integrated circuit assembly 36 includes an LM555 timer integrated circuit chip 35 configured as an astable oscillator. In alternative embodiments, the integrated circuit may be comprised of any electrical component consistent with the function as described herein.

When the marking device starter button 34 (also labeled as SW1 in the FIG. 3 circuit diagram) is depressed, the integrated circuit chip 35 outputs a pulse train from pin 3 to the marker switch assembly 38. The combined values of R1, R2 and R3 plus the capacitance of C1 determines the pulse frequency. As shown in FIG. 3, in the preferred embodiment, the respective resistance values for R1, R2, and R3 are 100 kΩ, 1MΩ, and 1MΩ respectively, and the capacitance of C1 is 0.1 µF, which results in an operating frequency of between 7 Hz and 3.5 Hz. The frequency can be adjusted by varying the resistance of R3.

As best shown in FIG. 3, the integrated circuit pulse is transmitted to the marker switch assembly 38. The marker switch assembly 38 is primarily comprised of a high-power metal-oxide-semiconductor field-effect transistor (MOSFET) 39 (also labeled Q1 in the FIG. 3 circuit diagram). When the MOSFET 39 receives the high portion of a current pulse from the integrated circuit assembly 36, it places the MOSFET 39 in conduction. When the MOSFET 39 is in conduction, current flows through the MOSFET 39 and the LED 32 is illuminated (i.e. the LED is flashed "on"). The low portion of the pulse turns the MOSFET 39 off so that the LED 32 is flashed "off".

In the preferred embodiment, the MOSFET 39 is a 2N7000-type component. In alternative embodiments, the marker switch assembly 38 may be comprised of any electrical component or combination thereof consistent with the function as described herein.

In addition to flashing the LED 32, the marking device 30 also affects the output waveform data. As shown in FIGS. 2 and 3, during most of the monitoring process, the waveform signal is essentially unaffected as the signal passes from the EPG monitor 28 through the waveform marker 40 to the controller 50. During this period the input voltage of the waveform marker assembly 40 operational amplifier 41 (at pin 8) is essentially a constant 12 volts.

However, as best shown in FIG. 3, when the high portion of the current pulse from the integrated circuit 41 places the MOSFET 39 in conductance, current passes through the LED 32 and correspondingly the voltage at R6, R7, and pin 8 of the operational amplifier 41 spikes downwardly.

When the amplifier 41 senses a voltage drop (at pin 8), it causes the voltage output of the amplifier 41 at pin 6 to also spike downwardly, thereby causing a corresponding downwardly spike 51 in the waveform output data (see FIG. 1). When the LED flashes off, the voltage of the amplifier 41 (at pin 8) returns to its pre-spike level and the waveform output data (at pin 6) also returns to its pre-spike form. The alternating high and low portions of the pulse train issued by the integrated circuit chip 41 cause the LED 32 to flash on and off and the waveform output data 29 to simultaneously spike downwardly 51 and then pop back up to its normal pre-spike level in a rhythmic spiking pattern 33 (see FIG. 1).

In the preferred embodiment, the operational amplifier 41 is a CA3140-type component. However, in alternative embodiments, the amplifier 41 may be comprised of any electrical component or combination thereof consistent with the function as described herein. Similarly, in the preferred embodiment, the resistance at R6 and R7 is 4.99 kΩ and 5 kΩ respectively. Adjusting the resistance of R7 modifies the extent of the downwardly voltage spike seen at pin 8 of the amplifier 41.

In operation, the synchronization process is initiated when an operator depresses a marking device start button 34 or other control mechanism on (or connected to) the marking device 30. As best shown in FIG. 3, depressing the start button 34 closes a circuit in the marking device integrated circuit assembly 36, resulting in a current pulse from the integrated circuit chip 35. The current pulse is directed to the marker switch assembly 38. When marker switch assembly 38 receives the current pulse, the high portion of the pulse places a MOSFET 39 in the marker switch assembly 38 in conductance. When the MOSFET 39 is in conductance, current flows through the LED 32, causing the LED 32 to flash "on". The LED is visible in a video camera frame along with the feeding insect.

When the LED flashes "on", pin 8 of an operational amplifier 41 in the waveform marker assembly 40 senses a voltage drop. Consequently the output waveform data (at pin 6) spikes downwardly so that when the LED 32 flashes "on", the output waveform data spikes downwardly.

As indicated above, at the conclusion of a data and video recording session, the operator opens the data and video files in The Observer software program, then reverses the video to the first video frame that evidences a flash of the LED 32. The operator then "marks" that frame as a video reference data point. The operator also scrolls back through the waveform data to the first waveform spike and "marks" that point as a waveform reference point. After the reference points have been marked, the operator uses the functions of The Observer™ computer program to synchronize the marked data point on the video with the marked data point on the EPG readout.

Once The Observer™ has synchronized the video and the wave form data, the two files are essentially "locked" together and the synchronization process is complete. The data is then configured to be further analyzed by scientists and/or other evaluators.

For the foregoing reasons, it is clear that the invention provides an innovative method and apparatus for synchronizing a video with simultaneously recorded waveform data. The current invention may be modified and customized as required by a specific operation or application, and the individual components may be modified and defined, as required, to achieve the desired result. For example, although the invention was originally intended to monitor a feeding insect, the invention may be modified to monitor any subject, including human subjects. In further embodiments, the invention may be applied to any endeavor that involves a data generating process that is simultaneously videoed. In these further alternative embodiments, the subject of the evaluation may be an electrical or mechanical process so that no living organisms are involved.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A system for synchronizing waveform data and a video of a subject as the subject generates the waveform data, the system comprising:
   a subject, the subject generating raw data;
   a monitoring system, the monitoring system receiving the raw data from the subject, processing the raw data into waveform data, and transmitting the waveform data;
   a video camera and recorder, the video camera videoing the subject during generation of the waveform data, the video, recorder recording a video taken by the video camera;
   a marking device, the marking device receiving the waveform data from the monitoring system and selectively creating a waveform reference point;
   a light, the marking device flashing the light in a frame of the video simultaneous with creation of the waveform reference point, thereby creating a video reference point;
   a controller, the controller receiving:
      (a) the waveform data and the waveform reference point; and
      (b) the video and the video reference point;
   a computer program, computer program being executable by the controller, the computer program having a means of synchronizing the waveform reference point with the video reference point;
   wherein an operator synchronizes the waveform data with the video by directing the computer program to synchronize the waveform reference point with the video reference point, thereby synchronizing the video with the waveform data.

2. The system of claim 1 wherein the subject is an insect.

3. The system of claim 1 wherein the monitoring system is an electrical penetration graph monitor.

4. The system of claim 1 wherein the waveform data is voltage fluctuation data.

5. The system of claim 1 wherein the video camera is a digital video camera.

6. The system of claim 1 wherein the marking device is comprised of an integrated circuit assembly, a marker switch assembly, and a waveform marker assembly.

7. The system of claim 6 wherein the marking device further comprises a start button connected with the integrated circuit assembly so that depressing the start button causes the integrated circuit assembly to transmit a current pulse to the light and the marker switch assembly.

8. The system of claim 7 wherein the integrated circuit assembly is comprised of an LM555 chip.

9. The system of claim 8 wherein the marker switch assembly is comprised of a metal-oxide-semiconductor field-effect transistor (MOSFET).

10. The system of claim 9 wherein the light is illuminated when the MOSFET is in conductance.

11. The system of claim 10 wherein the MOSFET is a 2N7000.

12. The system of claim 6 wherein the waveform marker assembly is comprised of an operational amplifier.

13. The system of claim 12 wherein voltage at the operational amplifier drops when the light is illuminated.

14. The system of claim 13 wherein the marking device generates waveform output data, the waveform output data spiking downwardly when voltage at the operational amplifier drops.

15. The system of claim 14 wherein the operational amplifier, is a CA3140.

16. The system of claim 15 wherein the operational amplifier senses input voltage at pin 8 and outputs waveform data at pin 6.

17. The system of claim 14 wherein the waveform output data is displayed on a computer monitor or a time-based chart.

18. The system of claim 17 wherein the waveform output data is displayed on a split screen monitor simultaneously with the video recording.

19. The system of claim 1 wherein the controller is a central processing unit.

20. A waveform output data and video marking device comprising:
   an integrated circuit assembly, the integrated circuit assembly generating a pulse train, each pulse having a high portion and a low portion;
   a marker switch assembly, the marker switch assembly being connected to the integrated circuit assembly;
   a light emitting diode (LED), the LED being connected to the marker switch assembly and flashing "on" when receiving the high portion of the pulse, the LED being positioned in a camera frame of a subject being videoed; and,
   a waveform marker assembly, the waveform marker assembly being connected to the marker switch assembly, the waveform marker assembly transmitting waveform output data associated with the subject being videoed, the waveform output data spiking downwardly when the waveform marker assembly senses a drop in voltage associated with the LED flash;
   wherein the marking device creates a video reference point when the LED flashes "on" and simultaneously creates a waveform reference point when the waveform output data spikes downwardly, thereby enabling an operator to synchronize the waveform output data with the video by synchronizing the waveform reference point with the video reference point.

21. The device for claim 20 further wherein the marking device further comprises a start button connected with the integrated circuit assembly so that depressing the start button causes the integrated circuit assembly to transmit the current pulse to the LED and the marker switch assembly.

22. The device of claim 21 wherein the integrated circuit assembly is comprised of an integrated circuit chip.

23. The device of claim 22 wherein the integrated circuit assembly is comprised of an LM555 chip.

24. The device of claim 20 wherein the marker switch assembly is comprised of a metal-oxide-semiconductor field-effect transistor (MOSFET).

25. The device of claim 24 wherein the LED is illuminated when the MOSFET is in conductance.

26. The device of claim 25 wherein the MOSFET is a 2N7000.

27. The device of claim 20 wherein the waveform marker assembly is comprised of an operational amplifier.

28. The device of claim 27 wherein voltage at the operational amplifier drops when the LED is illuminated.

29. The device of claim 28 wherein the waveform output data spikes downwardly when voltage at the operational amplifier drops.

30. The device of claim 27 wherein the operational amplifier is a CA3140.

31. The device of claim 30 wherein the operational amplifier senses input voltage at pin 8 and outputs waveform data at pin 6.

32. The device of claim 20 wherein the output waveform data is displayed on a computer monitor or a time-based chart.

33. A method of synchronizing waveform data and a video, the method comprising the steps of:
 (a) identifying a subject;
 (b) starting a video recording process directed to the subject;
 (c) initiating an electronic monitoring process directed to the subject so that results of the monitoring process are expressed as waveform data, the waveform data being generated while the subject is being videoed;
 (d) transmitting the waveform data to a marking device, the marking device having a waveform data output;
 (e) initiating a marking process by depressing a start button attached to the marking, device, depressing the start button causing a light emitting diode (LED) to flash "on" and the marking device waveform output data to spike downwardly;
 (f) terminating the marking process by releasing the start button, thereby extinguishing the LED and terminating downwardly spiking of the waveform output data so that the waveform output data is returned to an unaffected state;
 (g) proceeding with the video recording process and the electronic monitoring process;
 (h) terminating the electronic monitoring process, a waveform data file being created during the electronic monitoring process; the waveform data file comprising a compilation of the waveform data output;
 (i) terminating the video recording process, a video recording being created during the video recording process;
 (j) scrolling through the waveform data file and identifying and marking a first downward spike in the waveform data file as a waveform reference point;
 (k) scrolling through the video recording and finding and Marking a first flash of the LED as a video reference point;
 (m) loading the waveform reference point and the video reference points into a computer program;
 (n) instructing the computer program to synchronize the waveform reference point with the video reference point so that the waveform file is locked with the video file.

34. The method of claim 33 wherein the subject in Step (a) is an insect and the waveform output data in steps (c) through (f), (h), (j), (m) and (n) expresses voltage fluctuations.

* * * * *